United States Patent
Huang et al.

(10) Patent No.: US 11,765,327 B2
(45) Date of Patent: Sep. 19, 2023

(54) METHOD AND CONTROL SYSTEM FOR CONTROLLING PROJECTORS OF DIFFERENT MODELS BY USING CONTROL CODES

(71) Applicants: BenQ Intelligent Technology (Shanghai) Co., Ltd, Shanghai (CN); BENQ CORPORATION, Taipei (TW)

(72) Inventors: Chih-Pen Huang, Taipei (TW); Chang-Sheng Lee, Taipei (TW); Tung-Chia Chou, Taipei (TW)

(73) Assignees: BenQ Intelligent Technology (Shanghai) Co., Ltd, Shanghai (CN); BENQ CORPORATION, Taipei (TW)

( * ) Notice: Subject to any disclaimer, the term of this patent is extended or adjusted under 35 U.S.C. 154(b) by 824 days.

(21) Appl. No.: 16/794,261

(22) Filed: Feb. 19, 2020

(65) Prior Publication Data

US 2020/0267358 A1 Aug. 20, 2020

(30) Foreign Application Priority Data

Feb. 20, 2019 (CN) .......................... 201910125885.0

(51) Int. Cl.
  *H04N 9/31* (2006.01)
  *G08C 17/02* (2006.01)
(52) U.S. Cl.
  CPC .......... *H04N 9/3147* (2013.01); *G08C 17/02* (2013.01); *G08C 2201/30* (2013.01); *G08C 2201/40* (2013.01)

(58) Field of Classification Search
  CPC .......... H04N 9/31–3197; G08C 17/02; G08C 23/04; G08C 2201/00–94
  See application file for complete search history.

(56) References Cited

U.S. PATENT DOCUMENTS

| | | | |
|---|---|---|---|
| 2011/0234474 A1* | 9/2011 | Natori | H04N 9/3147 345/1.3 |
| 2017/0212719 A1* | 7/2017 | Fujimori | H04N 21/4122 |
| 2018/0068555 A1 | 3/2018 | Su | |
| 2020/0159483 A1* | 5/2020 | Yoshihara | G09G 5/006 |

FOREIGN PATENT DOCUMENTS

| | | |
|---|---|---|
| CN | 101311980 A | 11/2008 |
| CN | 104331053 A | 2/2015 |
| CN | 106303480 A | 1/2017 |
| CN | 106416143 A | 2/2017 |
| TW | 201104561 A1 | 2/2011 |
| TW | 201604811 A | 2/2016 |
| TW | 201717649 A | 5/2017 |

\* cited by examiner

*Primary Examiner* — Bao-Luan Q Le
*Assistant Examiner* — Christopher A Lamb, II
(74) *Attorney, Agent, or Firm* — Winston Hsu

(57) ABSTRACT

A method for controlling projectors includes identifying a first projector and a second projector by using a database, acquiring a first control code of the first projector and a second control code of the second projector after the first projector and the second projector are identified, and generating at least one control signal to the first projector and the second projector for controlling operational actions of the first projector and the second projector according to the first control code and the second control code.

18 Claims, 9 Drawing Sheets

METHOD AND CONTROL SYSTEM FOR CONTROLLING PROJECTORS OF DIFFERENT MODELS BY USING CONTROL CODES

BACKGROUND OF THE INVENTION

1. Field of the Invention

The present invention illustrates a method and a control system for controlling projectors, and more particularly, a method and a control system for controlling projectors of different models by using control codes.

2. Description of the Prior Art

With the developments of technologies, various projectors can be used for directly displaying projected images or stitching projected images cooperatively. A user can set various display parameters of the projectors by using their control panels or remote controllers. Currently, some advanced projectors capable of performing a remote control function through an internet have become more attractive. The user can remotely control or monitor at least one projector at any place by using a remote control or a smart phone. Therefore, these projectors capable of performing the remote control function can provide high convenience of operation.

In order to further improve convenience of operation, at least one built-in communications circuit or module of a specific communications protocol can be applied to the projector for establishing an internet link. However, projectors of different models (or say "different brands") have different communications protocols or different communications modes. When the user wants to control at least two projectors of different models at the same time by using a control center, the control center has to install dedicated driving program packets or control program packets for performing a control process. In other words, the control center has to install a plurality of driving program packets or control program packets for accessing control codes and communications configurations of the at least two projectors at the same time. For the control center with a single operating system (OS), installing the plurality of driving program packets or control program packets requires a lot of time. Further, since each driving program packet or control program packet has its own compatibility, the control center is prone to result in software conflicts or unstable operations.

SUMMARY OF THE INVENTION

In an embodiment of the present invention, a method for controlling projectors is disclosed. The method comprises identifying a first projector and a second projector by using a database, acquiring a first control code of the first projector and a second control code of the second projector after the first projector and the second projector are identified, and generating at least one control signal to the first projector and the second projector for controlling operational actions of the first projector and the second projector according to the first control code and the second control code.

In another embodiment of the present invention, a control system is disclosed. The control system comprises a first projector, a second projector, and a central control terminal. The first projector comprises a first memory, a first identification module, and a first processor. The first memory is configured to save a first control code list. The first identification module is coupled to the first memory and configured to identify a first control code from the first control code list. The first processor is coupled to the first memory and the first identification module and configured to control an operational action of the first projector according to the first control code. The second projector comprises a second memory, a second identification module, and a second processor. The second memory is configured to save a second control code list. The second identification module is coupled to the second memory and configured to identify a second control code from the second control code list. The second processor is coupled to the second memory and the second identification module and configured to control an operational action of the second projector according to the second control code. The central control terminal is coupled to the first projector and the second projector. The central control terminal comprises a third memory, a third processor, and a transceiver. The third memory has a database. The third memory is configured to save identification data of the first projector and the second projector, and save all control codes of the first processor and the second processor. The third processor is coupled to the database and configured to generate at least one control signal according to the first control code and the second control code. The transceiver is coupled to the third processor and configured to transmit the at least one control signal to the first projector and the second projector. The third processor identifies the first projector and the second projector by using the database, and acquires the first control code of the first projector and the second control code of the second projector after the first projector and the second projector are identified.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
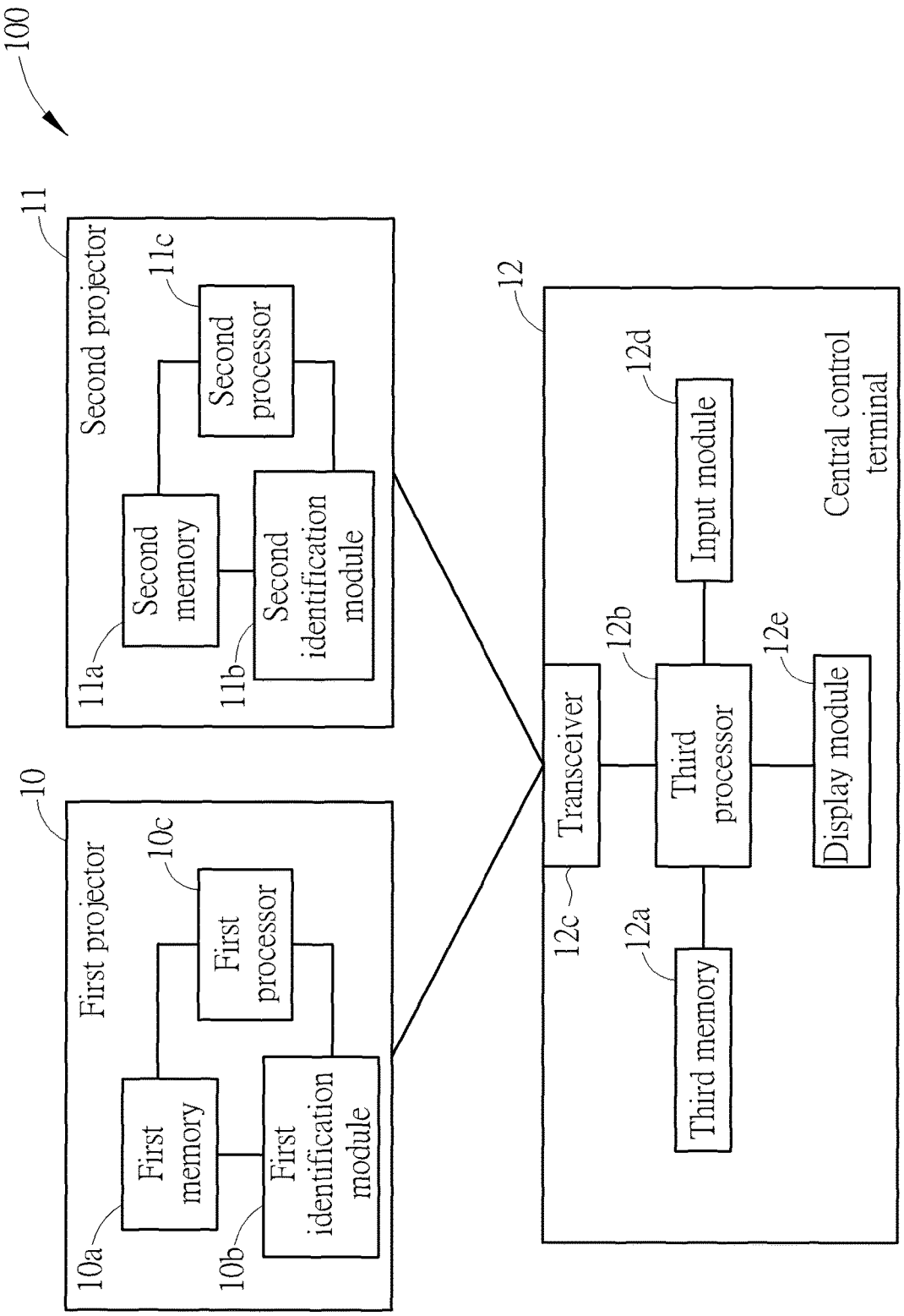
FIG. 1 is a block diagram of a control system according to an embodiment of the present invention.

FIG. 1 is a block diagram of a control system 100 according to an embodiment of the present invention. The control system 100 includes a first projector 10, a second projector 11, and a central control terminal 12. The first projector 10 can be a projector of any model or any brand. The first projector 10 includes a first memory 10a, a first identification module 10b, and a first processor 10c. The first memory 10a is used for saving a first control code list. The first memory 10a can be any memory unit, such as a non-volatile memory (NVM) or an electrically erasable programmable read only memory (EEPROM). Each control code in the first control code list can be a binary, an octal or a hexadecimal data sequence. The each control code can be regarded as a digital command for driving an operational action of the first projector 10. The first identification module 10b is coupled to the first memory 10a for identifying a first control code from the first control code list. For example, the first identification module 10b can detect a presence of a first control code from the first control code list. When the first control code is present, the first identification module 10b can further identify the first control code for determining eligibility of the first control code and acquiring operational action information of the first control code. The first processor 10c is coupled to the first identification module 10b and the first memory 10a for controlling the operational action of the first projector 10 according to the first control code. The first processor 10c can be any processing unit, such as a microprocessor, a scaler, or a central processing unit (CPU). Similarly, the second projector 11 can be a projector of any model or any brand. The second projector 11 includes a second memory 11a, a second identification module 11b, and a second processor 11c. The second memory 11a is used for saving a second control code list. The second memory 11a can be any memory unit, such as an NVM or EEPROM. Each control code in the second control code list can be a binary, an octal or a hexadecimal data sequence. The each control code can be regarded as a digital command for driving an operational action of the second projector 11. The second identification module 11b is coupled to the second memory 11a for identifying a second control code from the second control code list. For example, the second identification module 11b can detect a presence of a second control code from the second control code list. When the second control code is present, the second identification module 11b can further identify the second control code for determining eligibility of the second control code and acquiring operational action information of the second control code. The second processor 11c is coupled to the second identification module 11b and the second memory 11a for controlling the operational action of the second projector 11 according to the second control code. The second processor 11c can be any processing unit, such as the microprocessor, the scaler, or the CPU. In the control system 100, models of the first projector 10 and the second projector 11 can be identical or different. When the models of the first projector 10 and the second projector 11 are identical, the first control code list and the second control code list are identical. When the models of the first projector 10 and the second projector 11 are different, the first control code list and the second control code list are different. Any hardware modification of the first projector 10 and the second projector 11 in the control system 100 falls into the scope of the present invention.

The central control terminal 12 is coupled to the first projector 10 and the second projector 11. The central control terminal 12 includes a third memory 12a having a database, a third processor 12b, and a transceiver 12c. The third memory 12a is used for saving identification data of the first projector 10 and the second projector 11. Further, the third memory 12a can be used for saving all control codes of the first processor 10 and the second processor 11. The third memory 12a can be a hard disk. The identification data of the first projector 10 and the second projector 11 can be programming codes constructed in a form of text data of a JavaScript Object Notation File (JSON File). However, the JSON File is only one format of the identification data of the first projector 10 and the second projector 11. The present invention is not limited to a specific format of the identification data. Moreover, a user can edit (i.e., for example, add data or delete data) at least one control code of the first projector 10 and the second projector 11 of the database in the third memory 12a for updating the database in the third memory 12a. The third processor 12b is coupled to the third memory 12a for generating at least one control signal according to the first control code and the second control code. The third processor 12b can be any processing unit, such as the microprocessor or the CPU. In the control system 100, after the user selects the first projector 10 and the second projector 11 by using the central control terminal 12, the third processor 12b can identify the first projector 10 and the second projector 11 by using the database in the third memory 12a. After the first projector 10 and the second projector 11 are identified, the third processor 12b can acquire the first control code of the first projector 10 and the second control code of the second projector 11. Further, the third processor 12b can perform data processing functions, such as performing an encoding process, an encrypting process, or a modulating process of the first control code and the second control code for generating the at least one control signal. The transceiver 12c is coupled to the third processor 12b for transmitting the at least one control signal to the first projector 10 and the second projector 11. In the control system 100, the transceiver 12c can be a wired transceiver or a wireless transceiver. For example, the transceiver 12c can be coupled to the first projector 10 and the second projector 11 through two cable lines. The transceiver 12c can also communicate with the first projector 10 and the second projector 11 through a Bluetooth link, an infrared link, or a Wi-Fi link. The central control terminal 12 can further include a display module 12e and an input module 12d. The display module 12e and the input module 12d are illustrated later. Details of operating the control system 100 for controlling the first projector 10 and the second projector 11 are illustrated below.

Figure 2:
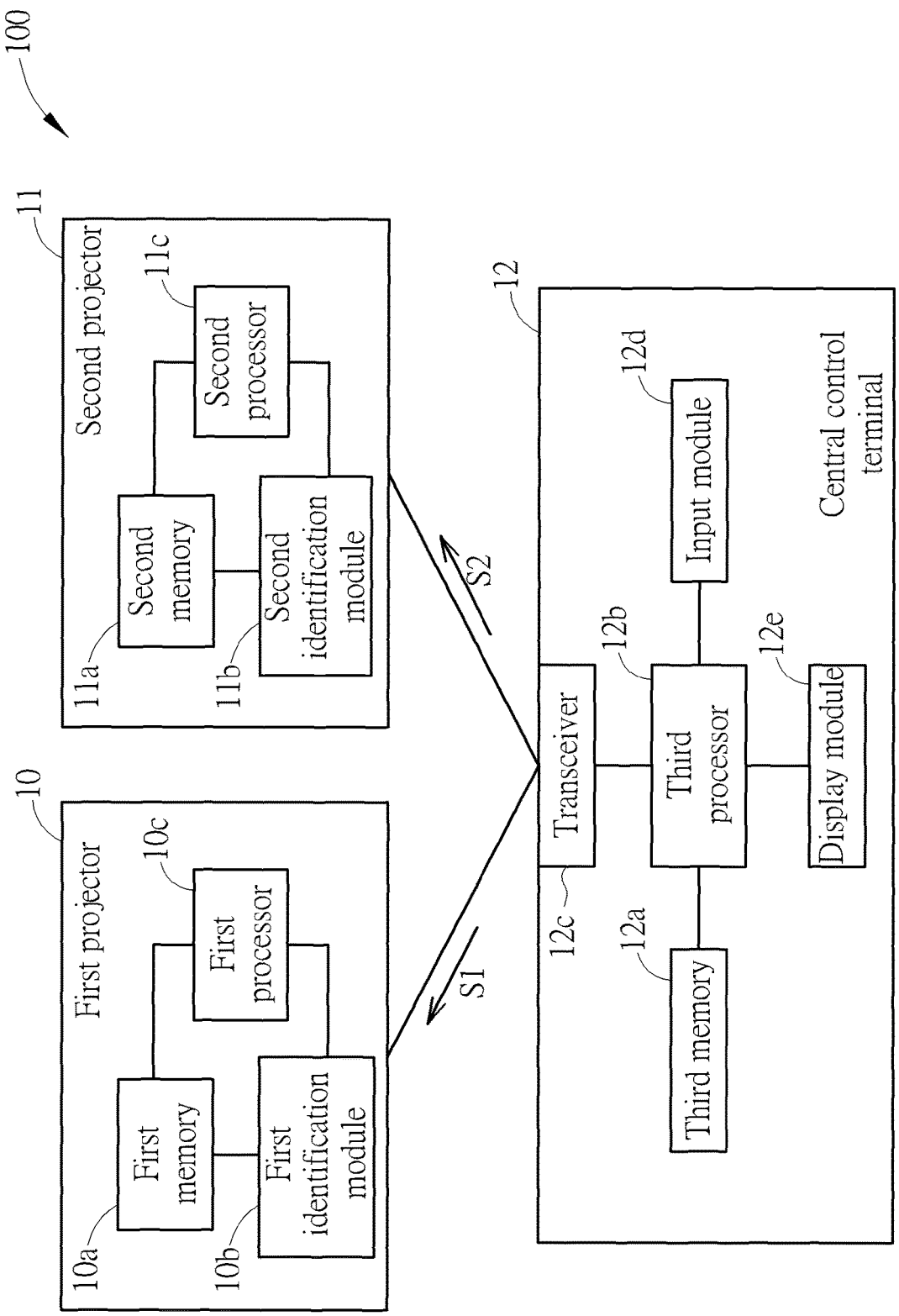
FIG. 2 is an illustration of controlling a first projector and a second projector of the control system in FIG. 1 by using two wired control signals.
Figure 3:
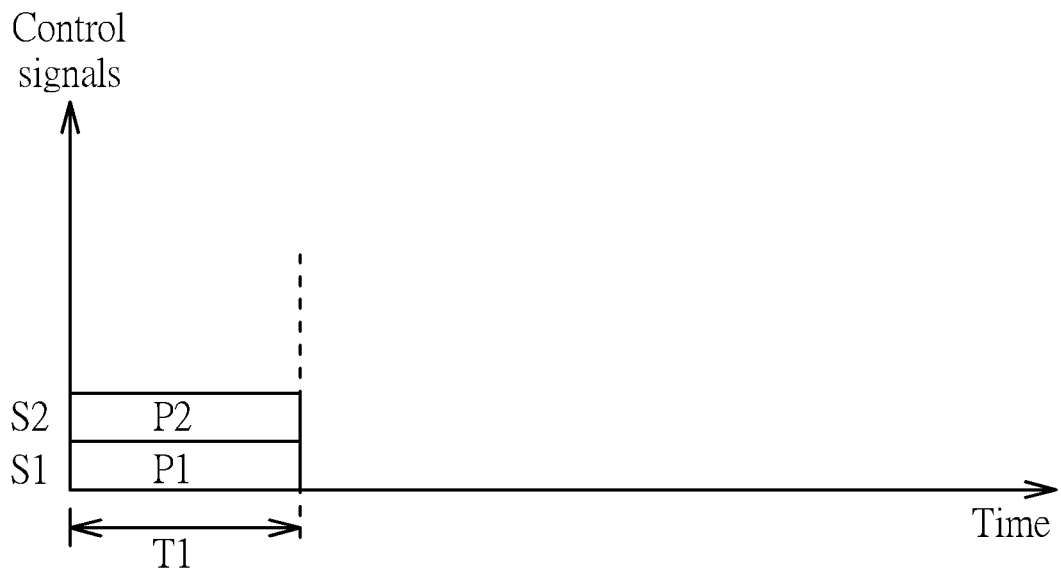
FIG. 3 is an illustration of a first mode for respectively transmitting two data packets by using the two wired control signals in FIG. 2.
Figure 4:
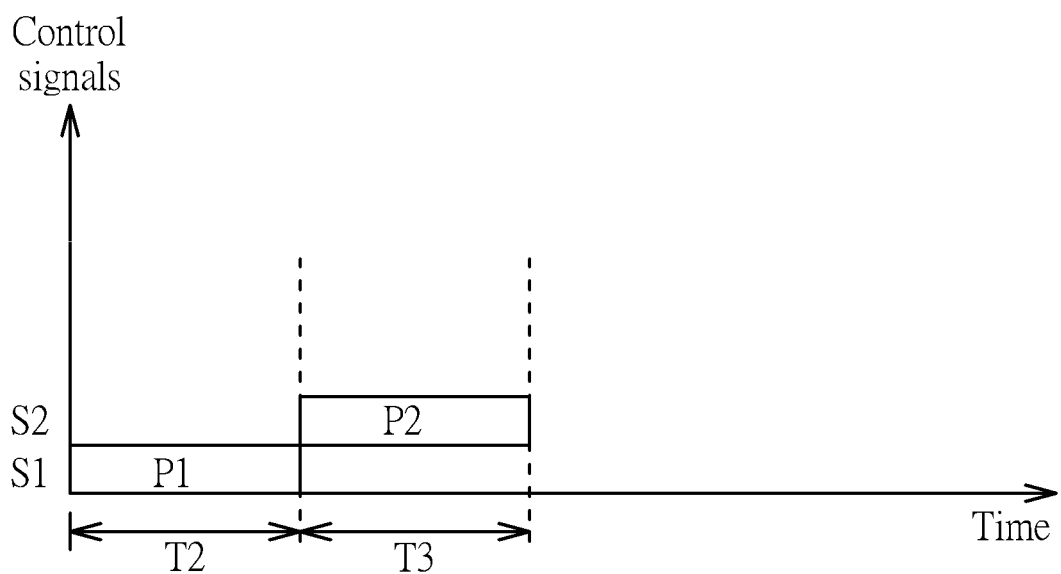
FIG. 4 is an illustration of a second mode for respectively transmitting the two data packets by using the two wired control signals in FIG. 2.

FIG. 2 is an illustration of controlling the first projector 10 and the second projector 11 of the control system 100 by using two wired control signals S1 and S2. FIG. 3 is an illustration of a first mode for respectively transmitting two data packets P1 and P2 by using the two wired control signals S1 and S2. FIG. 4 is an illustration of a second mode for respectively transmitting the two data packets P1 and P2 by using the two wired control signals S1 and S2. As shown in FIG. 2, the transceiver 12c of the central control terminal 12 can be the wired transceiver. Therefore, the transceiver 12c can transmit a first wired control signal S1 to the first projector 10 and transmit a second wired control signal S2 to the second projector 11. The first wired control signal S1 includes a first data packet corresponding to the first control code (i.e., the first data packet P1 in FIG. 3 and FIG. 4). The second wired control signal S2 includes a second data packet corresponding to the second control code (i.e., the second data packet P2 in FIG. 3 and FIG. 4). Here, payloads of the first data packet P1 and the second data packet P2 can carry information of the control codes. The first processor 10c can decode the first data packet P1 for acquiring data of the first control code after the first wired control signal S1 is received by the first projector 10. Similarly, the second processor 11c can decode the second data packet P2 for acquiring data of the second control code after the second wired control signal S2 is received by the second projector 11. The first data packet P1 and the second data packet P2 are different when models of the first projector 10 and the second projector 11 are different. Details of acquiring control codes are illustrated below.

The transceiver 12c can simultaneously transmit the first wired control signal S1 and the second wired control signal S2. By doing so, a timing of receiving the first data packet P1 by the first projector 10 and a timing of receiving the second data packet P2 by the second projector 11 are almost identical. Therefore, the first projector 10 and the second projector 11 can be synchronously controlled. As shown in FIG. 3, the transceiver 12c can transmit the first wired control signal S1 to the first projector 10 and transmit the second wired control signal S2 to the second projector 11 during a time interval T1. In other words, the first data packet P1 and the second data packet P2 can be regarded as two data packets simultaneously transmitted from the transceiver 12c during the time interval T1. Therefore, when the first processor 10c of the first projector 10 decodes the first packet P1 for acquiring the data of the first control code, simultaneously, the second processor 11c of the second projector 11 decodes the second packet P2 for acquiring the data of the second control code. Further, after the data of the first control code is identified by the first processor 10c through the first identification module 10b, the first operational action of the first projector 10 can be triggered by the first processor 10c. After the data of the second control code is identified by the second processor 11c through the second identification module 11b, the second operational action of the second projector 11 can be triggered by the second processor 11c. In other words, since the first projector 10 and the second projector 11 can acquire their control codes simultaneously, the central control terminal 12 can synchronously control the first projector 10 and the second projector 11.

The transceiver 12c can also transmit the first wired control signal S1 and the second wired control signal S2 by using "a time-division process". Here, a timing of receiving the first data packet P1 by the first projector 10 and a timing of receiving the second data packet P2 by the second projector 11 are different. As shown in FIG. 4, the transceiver 12c transmits the first wired control signal S1 to the first projector 10 during the time interval T2, and then transmits the second wired control signal S2 to the second projector 11 during the time interval T3. In other words, after the first packet P1 is transmitted during the time interval T2, the second packet P2 is transmitted during the time interval T3. Therefore, the first packet P1 and the second packet P2 can be regarded as two time-division data packets. Therefore, after the first processor 10c of the first projector 10 decodes the first packet P1 for acquiring the data of the first control code, the second processor 11c of the second projector 11 decodes the second packet P2 for acquiring the data of the second control code. Further, after the data of the first control code is identified by the first processor 10c through the first identification module 10b, the first operational action of the first projector 10 can be triggered by the first processor 10c. After the data of the second control code is identified by the second processor 11c through the second identification module 11b, the second operational action of the second projector 11 can be triggered by the second processor 11c. In FIG. 4, although a timing of acquiring the first control code by the first projector 10 and a timing of acquiring the second control code by the second projector 11 are different, no instant extremely high power is required for transmitting the first wired control signal S1 and the second wired control signal S2 to two projectors 10 and 11 from the central control terminal 12. In other words, although the central control terminal 12 asynchronously controls the first projector 10 and the second projector 11, the central control terminal 12 does not require high complexity hardware or high power consumption hardware, thereby resulting in high design flexibility.

Figure 5:
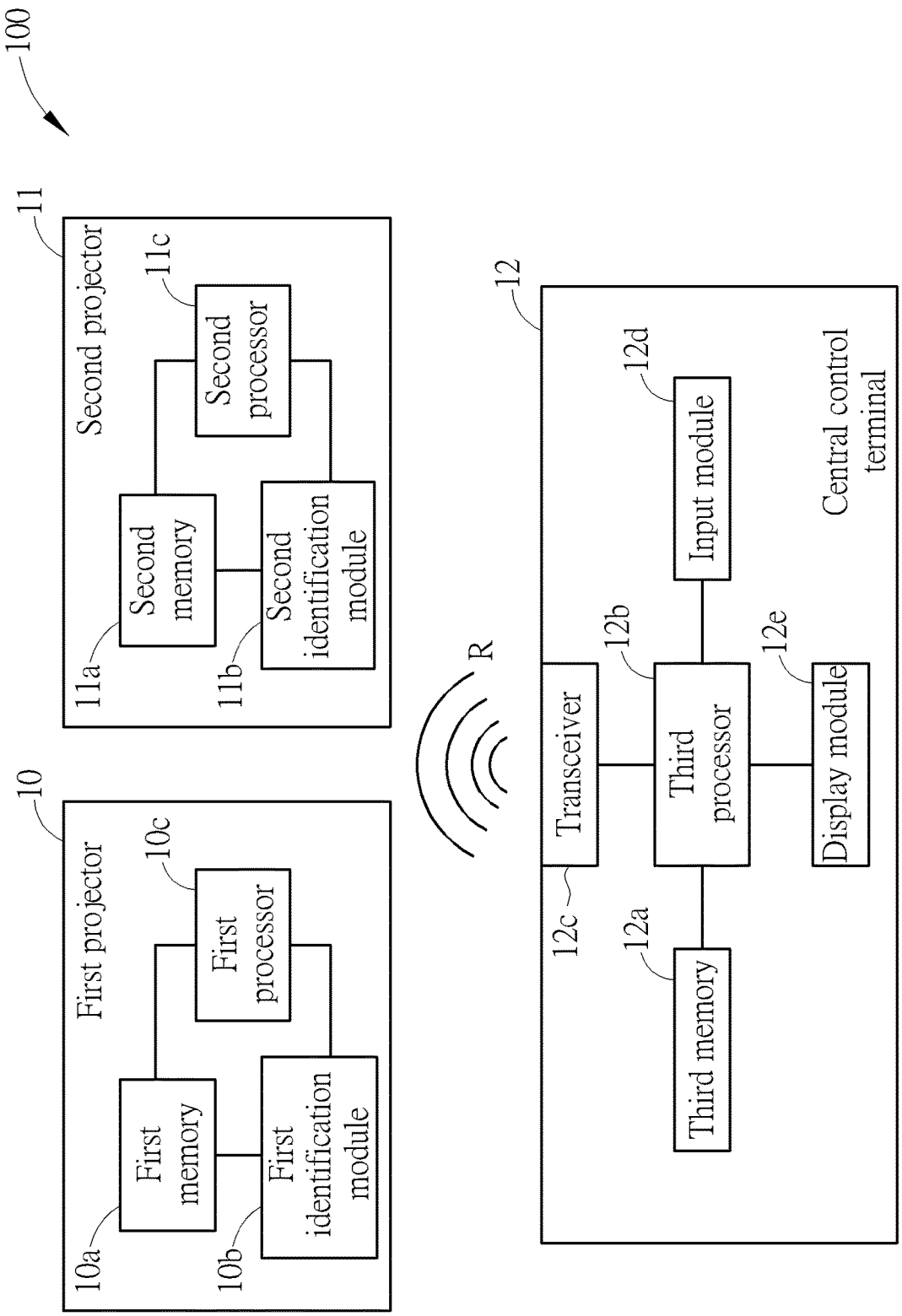
FIG. 5 is an illustration of controlling the first projector and the second projector of the control system in FIG. 1 by using a wireless control signal.
Figure 6:
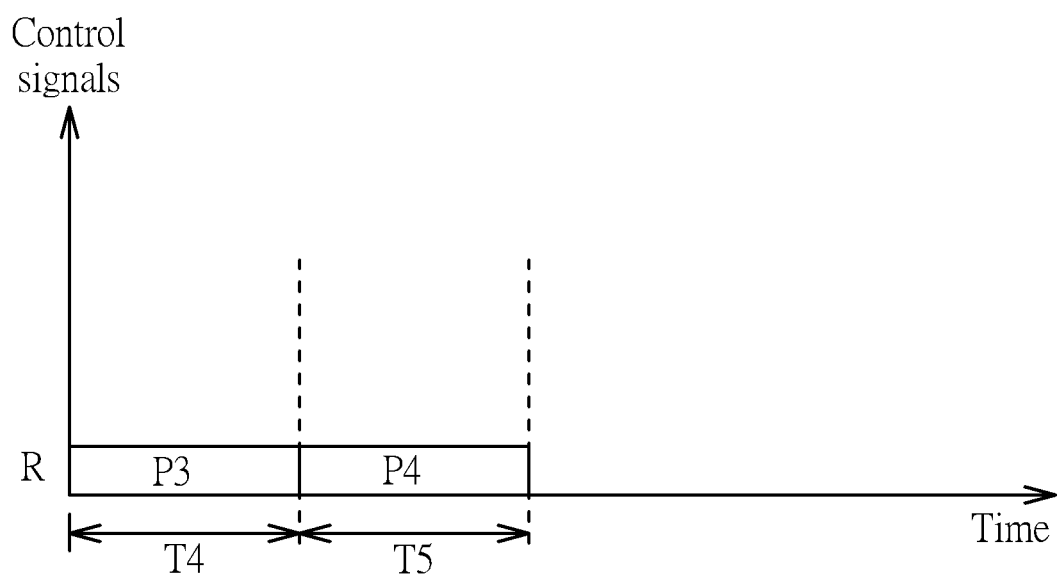
FIG. 6 is an illustration of transmitting two data packets by using the wireless control signal in FIG. 5.

FIG. 5 is an illustration of controlling the first projector 10 and the second projector 11 of the control system 100 by using a wireless control signal R. FIG. 6 is an illustration of transmitting two data packets P3 and P4 by using the wireless control signal R of the control system 100. As shown in FIG. 5, the transceiver 12c of the central control terminal 12 can be a wireless transceiver. Therefore, the transceiver 12c can broadcast the wireless control signal R. Here, the first processor 10c and the second processor 11c can receive the wireless control signal R. The wireless control signal R can include a third data packet P3 corresponding to the first control code and a fourth data packet P4 corresponding to the second control code. Here, payloads of the third data packet P3 and the fourth data packet P4 can carry information of the control codes. The first processor 10c can only use data of the first control code from the third data packet P3 for performing its operation. Similarly, the second processor 11c can only use data of the second control code from the fourth data packet P4 for performing its operation. Details are illustrated below.

In the wireless control signal R, the third data packet P3 and the fourth data packet P4 can be regarded as two time-division data packets. As shown in FIG. 6, the wireless control signal R can carry the third data packet P3 during a time interval T4. The wireless control signal R can carry the fourth data packet P4 during a time interval T5. In other words, the first projector 10 and the second projector 11 receive the third packet P3 first, and then receive the fourth packet P4. Therefore, the first processor 10c can decode the third data packet P3 and the fourth data packet P4 sequentially for acquiring data of the first control code and data of the second control code after the wireless control signal R is received by the first projector 10. Further, the first processor 10c can identify the data of the first control code and ignore the data of the second control code. After the data of the first control code is identified by the first processor 10c through the first identification module 10b, the first operational action of the first projector 10 can be triggered by the first processor 10c. Similarly, the second processor 11c can decode the third data packet P3 and the fourth data packet P4 sequentially for acquiring data of the first control code and data of the second control code after the wireless control signal R is received by the second projector 11. Further, the second processor 11 can identify the data of the second control code and ignore the data of the first control code. After the data of the second control code is identified by the second processor 11 through the second identification module 11b, the second operational action of the second projector 11 can be triggered by the second processor 11c. Any reasonable hardware or technology modification of the transceiver 12c falls into the scope of the present invention.

In the control system 100, the first projector 10 and the second projector 11 can support a PJ Link standard for exchanging data between two different communications terminals. Each of the first projector 10 and the second projector 11 can include an RS-232 port, a local area network (LAN) port, and/or an infrared transmission port for receiving the wired or wireless control signal transmitted from the transceiver 12c.

The central control terminal 12 can further include the input module 12d. The input module 12d can be any data input device, such as a keyboard, a mouse, a touch screen or buttons. The input module 12d is coupled to the third processor 12b and the third memory 12a for inputting data to the database. In another embodiment, the input module 12d can be only coupled to the third processor 12b. The third processor 12b can transmit data inputted from the input module 12d to the database of the third memory 12a. As previously mentioned, the identification data of the first projector 10 and the second projector 11 can be programming codes constructed in the form of the text of the JavaScript Object Notation File (JSON File). When the identification data of the first projector 10 and the second projector 11 of the database in the third memory 12a is incomplete, the central control terminal 12 can provide a data editing function. The user can use the data editing function for adding or deleting data of the database in the third memory 12a. For example, the user can use the input module 12d (i.e. such as a keyboard) for editing the JSON File of the first projector 10 and the second projector 11 for updating the database. Further, the user can also add identification data of other brand projectors to the database in the third memory 12a, or can delete identification data of an eliminated brand projector of the database. After the user adds the identification data to the database in the third memory 12a by using the input module 12d, the third processor 12b can accurately identify projectors of different models or different brands.

Figure 7:
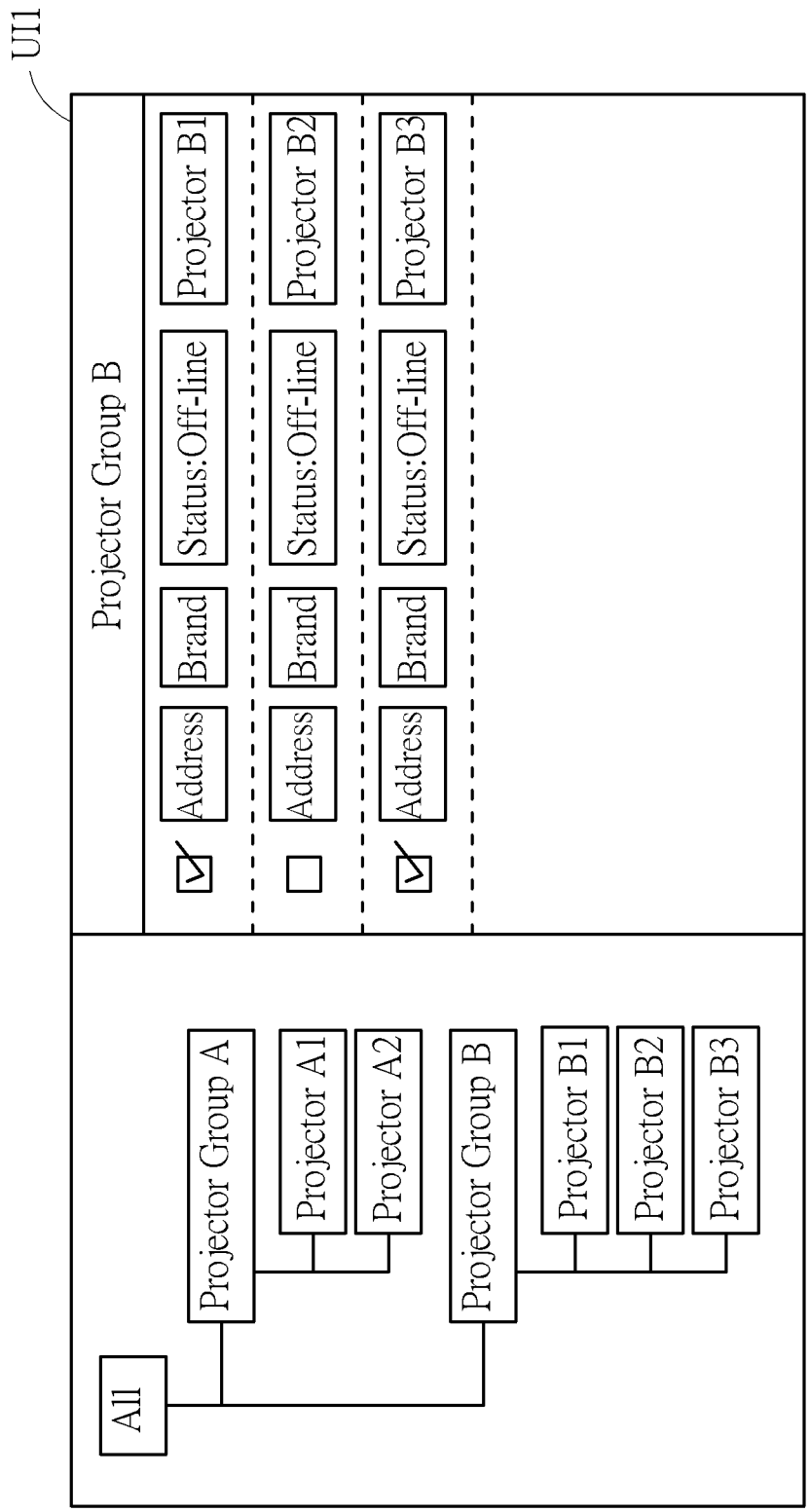
FIG. 7 is an illustration of a selection interface displayed by using a display module of the control system in FIG. 1.

FIG. 7 is an illustration of a selection interface displayed by using a display module 12e of the control system 100. The central control terminal 12 can further include the display module 12e. The display module 12e is coupled to the third processor 12b for displaying at least one virtual key or displaying a graphical user interface (GUI) including the at least one virtual key according to functions of the first control code and the second control code. In FIG. 7, the third processor 12b can control the display module 12e to display a selection interface UI1 including at least one projector group according to the database in the third memory 12a. For example, a left side of the selection interface UI1 can be used for displaying correlations of all projectors in a form of a layered structure. In FIG. 7, all projectors can be partitioned into a projector group A and a projector group B. The projector group A includes projectors A1 and A2. The projector group B includes projectors B1 to B3. When the user selects the projector group B, details of the projectors B1 to B3 can be displayed on a right side of the selection interface UI1. For example, the addresses (i.e., such as Internet Protocol addresses), brands, and statuses of the projectors B1 to B3 can be displayed. The user can select the first projector 10 and the second projector 11 from at least one projector group through the selection interface UI1. For example, the user selects the projector B1 as the first projector 10 and selects the projector B3 as the second projector 11 by checking their window boxes of the selection interface UI1.

Figure 8:
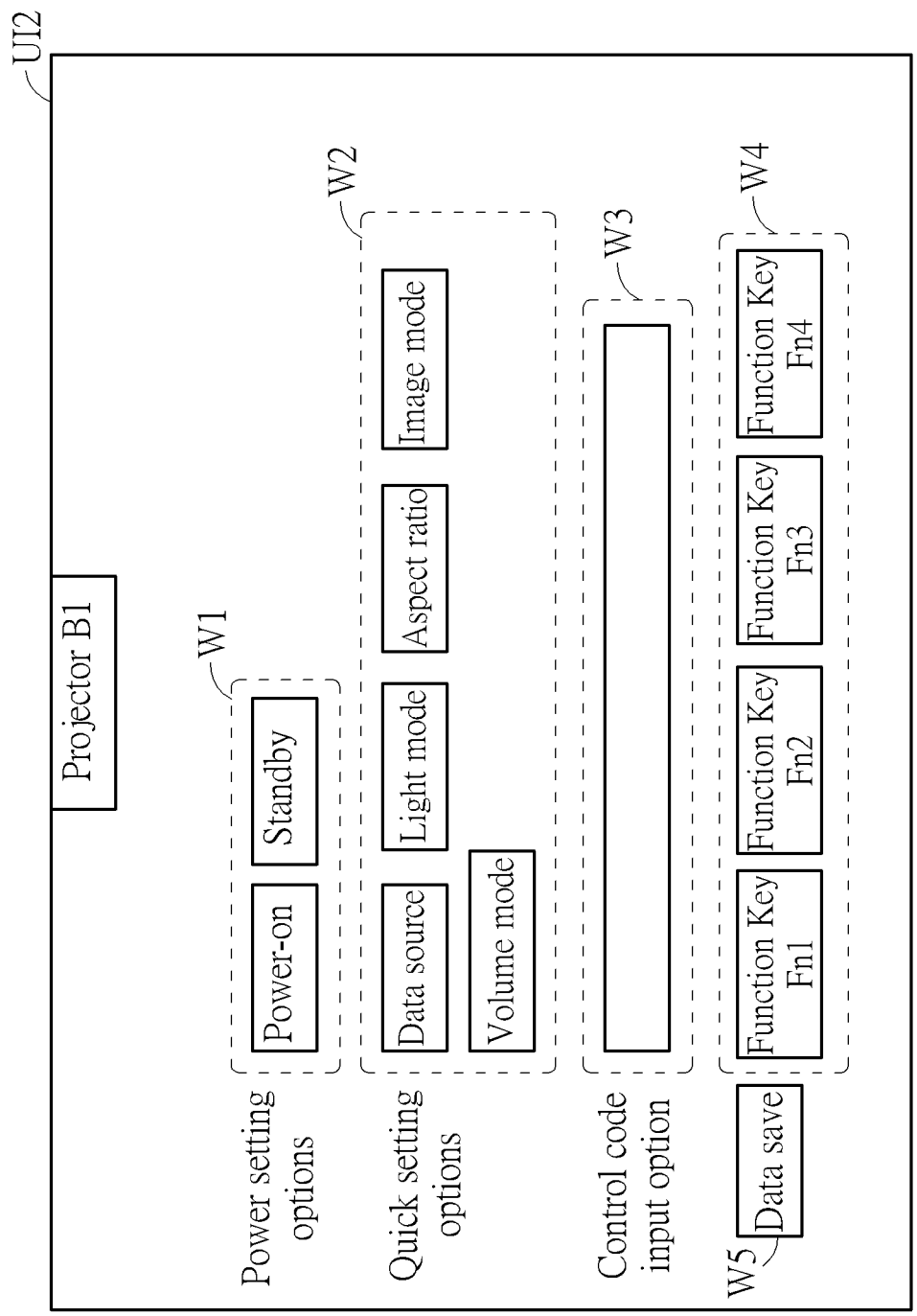
FIG. 8 is an illustration of a configuration interface of a specific projector displayed by using the display module of the control system in FIG. 1.

FIG. 8 is an illustration of a configuration interface UI2 of a specific projector displayed by using the display module 12e of the control system 100. The control system 100 can be used for setting configurations of each projector. For example, when the user selects the projector B1 for setting its configurations, the display module 12e can display the configuration interface UI2 of the projector B1. The configuration interface UI2 of the projector B1 can include a plurality of configuration options, such as power setting options, quick setting options, a control code input option, and function key setting options. Further, the power setting options can be located within an area W1 of the configuration interface UI2. For example, the area W1 of the configuration interface UI2 can display a power-on option and a standby option. The quick setting options can be located within an area W2 of the configuration interface UI2. For example, the area W2 of the configuration interface UI2 can display a data source option, a light mode option, an aspect ratio option, an image mode option, and a volume mode option. The control code input option can be located within an area W3 of the configuration interface UI2. The user can input a specific control code (hereafter, say "a third control code") to the area W3 by using the input module 12d for updating the database in the third memory 12a. Then, the third processor 12b can generate a user-defined control signal to the projector B1 for controlling a user-defined operational action of the projector B1 according to the third control code. An area W4 of the configuration interface UI2 of the projector B1 can display at least one virtual key (or say, "function key"). For example, the area W4 of the configuration interface UI2 can include a function key Fn1 to a function key Fn4. The function key Fn1 to the function key Fn4 can be built-in function keys generated according to the first control code and the second control code. However, at least one function key can be customized by the user. For example, a user-defined function key can be generated according to the third control code and then displayed on the configuration interface UI2. The configuration interface UI2 can further include a key W5 for saving all configurations. After all configurations of the projector B1 are adjusted by using the configuration interface UI2, the user can use the key W5 for saving all configurations. Therefore, the key W5 can be regarded as a data saving key. Further, in the control system 100, if the projector B1 is a specific brand projector and its identification data has been built in the JSON File, detail configurations and function keys of the configuration interface UI2 can automatically correspond to the projector B1. However, if the identification data of the projector B1 is absent in the JSON File, the user can input control codes of the projector B1 to the database through a window of the area W3 for editing functions of the projector B1. After all functions and all configurations of the projector B1 are completely set, the user can use the key W5 for saving all user-defined data. For example, if the identification data of the projector B1 is absent in the JSON File, the user can input a control code corresponding to a power-on function of the projector B1 through the area W3 for generating a virtual power-on key. After data of the power-on function of the projector B1 is saved to the database in the third memory 12a, the central control terminal 12 can control the power-on function of the projector B1.

Figure 9:
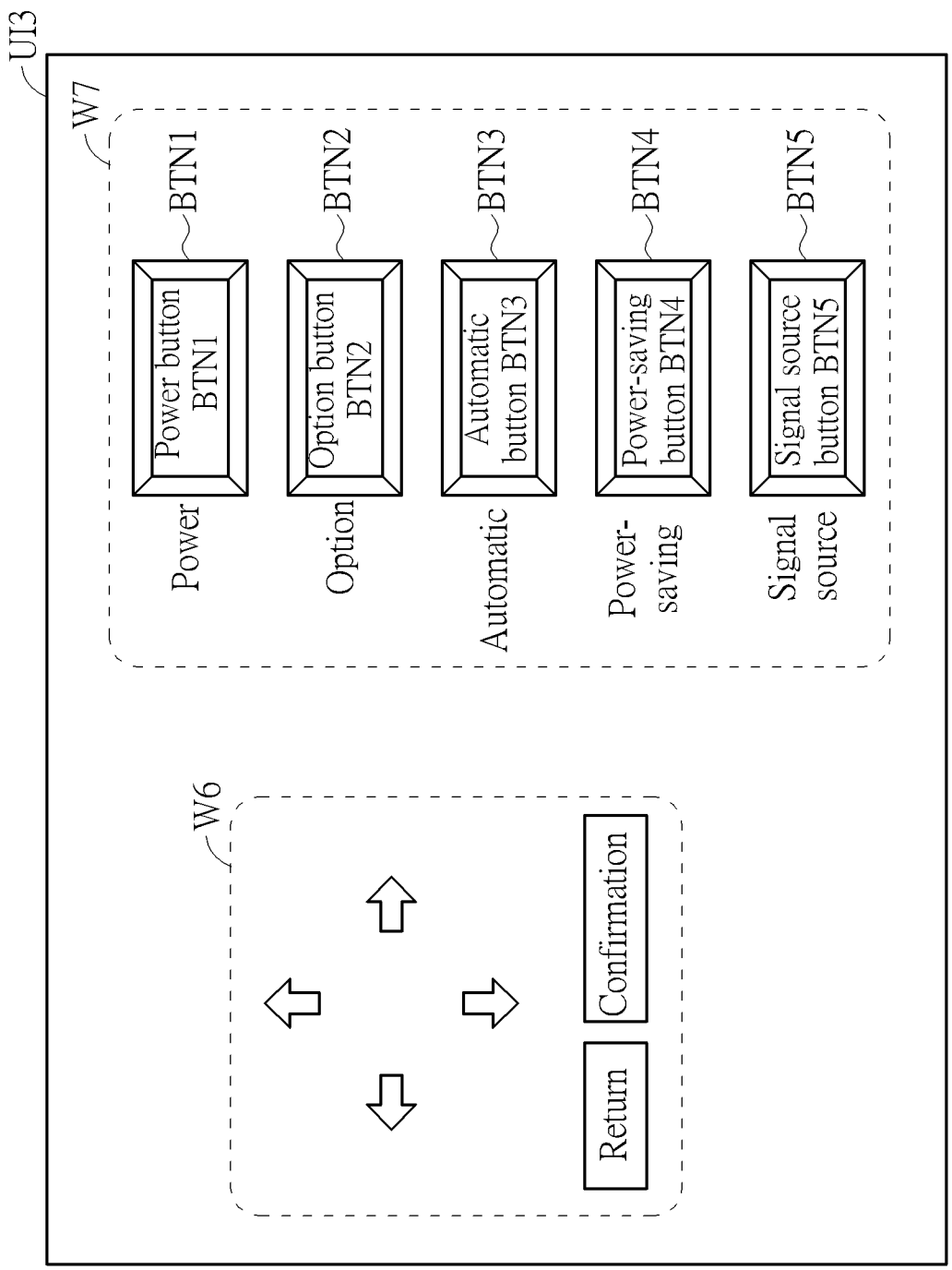
FIG. 9 is an illustration of a graphical user interface displayed by using the display module of the control system in FIG. 1.

FIG. 9 is an illustration of a graphical user interface UI3 displayed by using the display module 12e of the control system 100. As previously mentioned, the display module 12e can be used for displaying the at least one virtual key or displaying the graphical user interface UI3 including the at least one virtual key. For example, an area W6 of the graphical user interface UI3 can display a D-Pad key, a return key, and a confirmation key. An area W7 can display a plurality of hotkeys, such as a power button BTN1, an option button BTN2, an automatic button BTN3, a power-saving button BTN4, and a signal source button BTN5. The graphical user interface UI3 can be saved in the third memory 12a and can be regarded as a control interface of a specific brand of projector. Since the graphical user interface UI3 includes familiar buttons of the control interface of the projector used by the user, the user can efficiently adjust all configurations of the projector. Further, the graphical user interface UI3 in FIG. 9 can also be used for controlling at least two projectors in a same projector group, such as controlling the projector B1 and the projector B3 selected from the projector group B in FIG. 8. Therefore, when the user uses the graphical user interface UI3 for adjusting at least one function parameter (i.e., such as using the option button BTN2 for adjusting brightness, volume, and/or other function parameters), the at least two projectors in the same projector group can be simultaneously controlled. In other words, the central control terminal 12 in the control system 100 can perform a one-to-many controlling process by using the graphical user interface UI3, thereby resulting in high convenience of operation.

Figure 10:
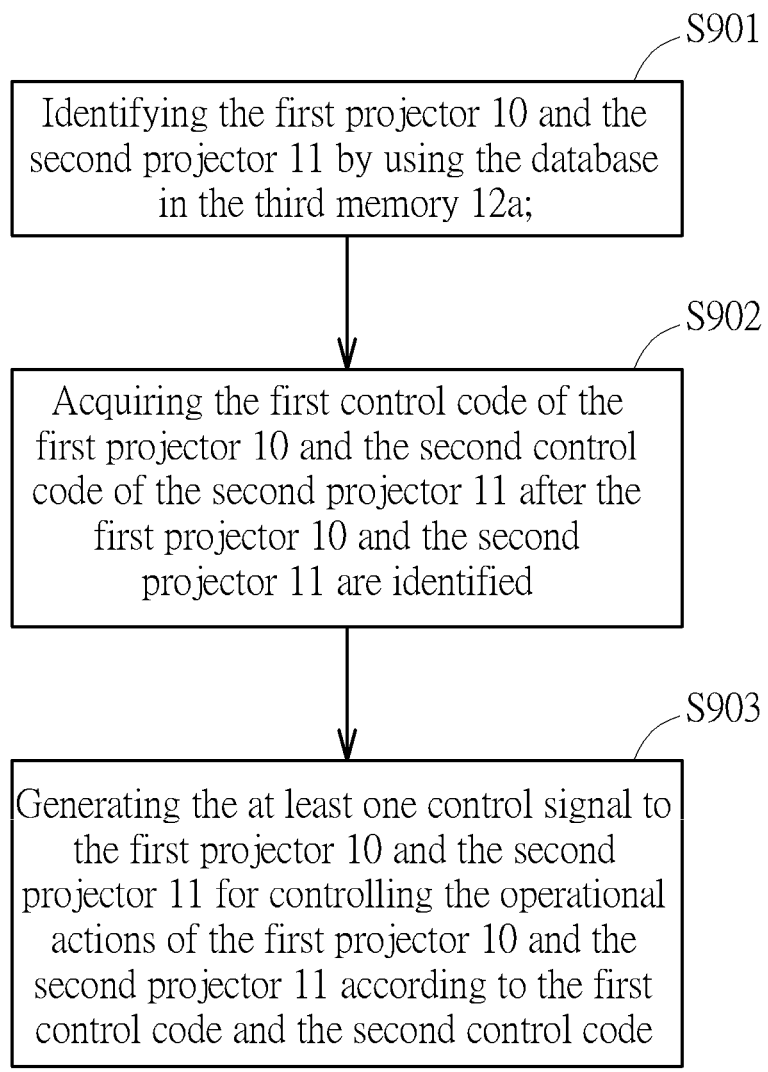
FIG. 10 is a flow chart of a method for controlling projectors performed by the control system in FIG. 1.

FIG. 10 is a flow chart of a method for controlling projectors performed by the control system 100. The method includes step S901 to step S903. Any reasonable technology modification falls into the scope of the present invention. Step S901 to step S903 are illustrated below.

step S901: identifying the first projector 10 and the second projector 11 by using the database in the third memory 12a;

step S902: acquiring the first control code of the first projector 10 and the second control code of the second projector 11 after the first projector 10 and the second projector 11 are identified;

step S903: generating the at least one control signal to the first projector 10 and the second projector 11 for controlling the operational actions of the first projector 10 and the second projector 11 according to the first control code and the second control code.

In step S901, when the identification data (i.e., such as the JSON File) of the first projector 10 and the second projector 11 in the database is incomplete, the user can manually edit identification data of the database in the third memory 12a. For example, data of various control codes, identification codes, communication modes, control protocols of the first projector 10 and/or the second projector 11 can be added to the database in the third memory 12a. Further, when the identification data of the first projector 10 and the second projector 11 in the database is complete, an automatic identification process can be selected by the user for identifying projectors. Then, the central control terminal 12 can identify the first projector 10 and the second projector 11 by using the database in the third memory 12a. In step S902, the central control terminal 12 can automatically acquire the first control code of the first projector 10 and the second control code of the second projector 11. However, the user can manually input the first control code of the first projector 10 and the second control code of the second projector 11 to the central control terminal 12. All control codes can be categorized for generating the control code list to the database in the third memory 12a according to different brands or different models of projectors. In step S903, the central control terminal 12 can generate the at least one control signal (i.e., the wired signal or the wireless signal) to the first projector 10 and the second projector 11 for controlling the operational actions (i.e., such as a power-on operation, a power-off operation, or any user-defined operation) of the first projector 10 and the second projector 11 according to the first control code and the second control code. Further, step S901 to step S903 can also introduce a warning process for informing the user an abnormal state of the central control terminal 12. For example, after the user select the automatic identification process, when the first projector 10 or the second projector 11 is unidentified, it implies that the identification data of the first projector 10 and the second projector 11 in the database is incomplete. Therefore, the central control terminal 12 can generate a warning signal for informing the user that the central control terminal 12 cannot support the operation actions of the first projector 10 or the second projector 11. After the user receives the warning signal, the central control terminal 12 can be switched to a manual mode for manually updating the database in the third memory 12a.

To sum up, the present invention illustrates a method for controlling projectors and a control system. The control system can control at least two projectors by using a wireless signal or two wired signals. Since a central control terminal in the control system can acquire identification data and all control codes of the at least two projectors, no additional control application program or driving program is required to install in the central control terminal. In other words, the central control terminal can directly control operational actions of the at least two projectors. The least two projectors can correspond to different brands or models. In other words, since the control system can integrate control setting functions of all projectors into the central control terminal, the convenience of operation can be increased for the user. Further, the central control terminal of the control system can provide a data editing function for updating the database. Therefore, a projector of a new brand or a new model can be easily added to a projector group of the database. Therefore, the method for controlling projectors and the control system of the present invention can provide high convenience of operation, high data expandability of controlling projectors of different brands or different models.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling projectors comprising:
  identifying a first projector and a second projector by using a database;
  acquiring a first control code of the first projector and a second control code of the second projector after the first projector and the second projector are identified;
  generating at least one control signal to the first projector and the second projector for controlling operational actions of the first projector and the second projector according to the first control code and the second control code; and
  editing identification data of the first projector and the second projector saved in the database for updating the database when the identification data of the first projector and the second projector is incomplete;
  wherein the identification data of the first projector and the second projector is in a form of text data of a JavaScript® Object Notation File (JSON File).

2. The method of claim 1, wherein the at least one control signal comprises a first wired control signal of the first projector and a second wired control signal of the second projector, the first wired control signal comprises a first data packet corresponding to the first control code, and the second wired control signal comprises a second data packet corresponding to the second control code.

3. The method of claim 2, further comprising:
  decoding the first data packet for acquiring data of the first control code after the first wired control signal is received by the first projector;
  identifying the data of the first control code by the first projector for triggering a first operational action;
  decoding the second data packet for acquiring data of the second control code after the second wired control signal is received by the second projector; and
  identifying the data of the second control code by the second projector for triggering a second operational action;
  wherein the first data packet and the second data packet are different when models of the first projector and the second projector are different.

4. The method of claim 1, wherein the at least one control signal comprises a wireless control signal, the wireless control signal comprises a third data packet corresponding to the first control code and a fourth data packet corresponding to the second control code, and the third data packet and the fourth data packet are two time-division data packets.

5. The method of claim 4, further comprising:
  decoding the third data packet and the fourth data packet sequentially for acquiring data of the first control code and data of the second control code after the wireless control signal is received by the first projector;
  identifying the data of the first control code acquired after the wireless control signal is received by the first projector for triggering a first operational action;
  ignoring the data of the second control code acquired after the wireless control signal is received by the first projector;
  decoding the third data packet and the fourth data packet sequentially for acquiring the data of the first control code and the data of the second control code after the wireless control signal is received by the second projector; and
  identifying the data of the second control code acquired after the wireless control signal is received by the second projector for triggering a second operational action;
  ignoring the data of the first control code acquired after the wireless control signal is received by the second projector;
  wherein the third data packet and the fourth data packet are different when models of the first projector and the second projector are different.

6. The method of claim 1, further comprising:
  inputting a third control code to the database for updating the database; and
  generating a user-defined control signal to the first projector or the second projector for controlling a user-defined operational action of the first projector or the second projector according to the third control code.

7. The method of claim 1, further comprising:
  displaying at least one virtual key or displaying a graphical user interface (GUI) comprising the at least one virtual key according to functions of the first control code and the second control code.

8. The method of claim 1, wherein the first projector and the second projector support a PJ Link standard for exchanging data between two different specifications, each of the first projector and the second projector comprises an RS-232 port, a local area network (LAN) port, and/or an infrared transmission port.

9. The method of claim 1, further comprising:
  generating a selection interface comprising at least one projector set according to data in the database; and
  selecting the first projector and the second projector from the at least one projector set through the selection interface.

10. A control system comprising:
  a first projector comprising:
    a first memory configured to save a first control code list;
    a first identification module coupled to the first memory and configured to identify a first control code from the first control code list; and
    a first processor coupled to the first memory and the first identification module and configured to control an operational action of the first projector according to the first control code;
  a second projector comprising:
    a second memory configured to save a second control code list;
    a second identification module coupled to the second memory and configured to identify a second control code from the second control code list; and
    a second processor coupled to the second memory and the second identification module and configured to control an operational action of the second projector according to the second control code; and
  a central control terminal coupled to the first projector and the second projector, the central control terminal comprising:
    a third memory having a database configured to save identification data of the first projector and the second projector, and configured to save all control codes of the first processor and the second processor;
    a third processor coupled to the third memory and configured to generate at least one control signal according to the first control code and the second control code;
    a transceiver coupled to the third processor and configured to transmit the at least one control signal to the first projector and the second projector; and
    an input module coupled to the third processor and the third memory and configured to input data to the database;
  wherein the third processor identifies the first projector and the second projector by using the database, and acquires the first control code of the first projector and the second control code of the second projector after the first projector and the second projector are identified; and
  wherein when the identification data of the first projector and the second projector saved in the database is incomplete, the input module is configured to edit the identification data of the first projector and the second projector for updating the database, and the identification data of the first projector and the second projector is in a form of text data of a JavaScript® Object Notation File (JSON File).

11. The system of claim 10, wherein the at least one control signal comprises a first wired control signal of the first projector and a second wired control signal of the second projector, the first wired control signal comprises a first data packet corresponding to the first control code, and the second wired control signal comprises a second data packet corresponding to the second control code.

12. The system of claim 11, wherein the first processor decodes the first data packet for acquiring data of the first control code after the first wired control signal is received by the first projector, and the second processor decodes the second data packet for acquiring data of the second control code after the second wired control signal is received by the second projector.

13. The system of claim 10, wherein the at least one control signal comprises a wireless control signal, the wireless control signal comprises a third data packet corresponding to the first control code and a fourth data packet corresponding to the second control code, and the third data packet and the fourth data packet are two time-division data packets.

14. The system of claim 13, wherein the first processor decodes the third data packet and the fourth data packet sequentially for acquiring data of the first control code and data of the second control code after the wireless control signal is received by the first projector, the first processor identifies the data of the first control code and ignores the data of the second control code, the second processor decodes the third data packet and the fourth data packet sequentially for acquiring the data of the first control code and the data of the second control code after the wireless control signal is received by the second projector, and the second processor identifies the data of the second control code and ignores the data of the first control code.

15. The system of claim 10, wherein the central control terminal further comprises:
   an input module coupled to the third processor and the third memory and configured to input a third control code to the database for updating the database;
   wherein the third processor generates a user-defined control signal to the first projector or the second projector through the transceiver for controlling a user-defined operational action of the first projector or the second projector according to the third control code.

16. The system of claim 10, wherein the central control terminal further comprises:
   a display module coupled to the third processor and configured to display at least one virtual key or display a graphical user interface (GUI) comprising the at least one virtual key according to functions of the first control code and the second control code.

17. The system of claim 10, wherein the first projector and the second projector support a PJ Link standard for exchanging data between two different specifications, each of the first projector and the second projector comprises an RS-232 port, a local area network (LAN) port, and/or an infrared transmission port.

18. The system of claim 10, wherein the central control terminal further comprises:
   a display module coupled to the third processor and configured to display a selection interface comprising at least one projector set according to data in the database;
   wherein the selection interface is configured to select the first projector and the second projector from the at least one projector set.

* * * * *